United States Patent [19]

Hedley

[11] Patent Number: 5,588,768
[45] Date of Patent: Dec. 31, 1996

[54] LOCKING ARRANGEMENT

[75] Inventor: Robert I. Hedley, Via Singleton, Australia

[73] Assignee: Hedweld Engineering Pty Ltd., New South Wales, Australia

[21] Appl. No.: 286,012

[22] Filed: Aug. 4, 1994

[30] Foreign Application Priority Data

Aug. 5, 1993 [AU] Australia .................. PM0408

[51] Int. Cl.$^6$ .............. F16B 7/00; F16B 13/00; B25G 3/00; F16G 11/00
[52] U.S. Cl. ............ 403/294; 403/292; 403/315; 403/316; 403/384
[58] Field of Search .................. 403/294, 315, 403/316, 319, 384, 386, 387

[56] References Cited

U.S. PATENT DOCUMENTS 3,664,011   5/1995   Labastrou .................. 29/526

Primary Examiner—Kenneth J. Dorner
Assistant Examiner—Bruce A. Lev
Attorney, Agent, or Firm—Hopgood, Calimafde, Kalil & Judlowe

[57] ABSTRACT

A locking arrangement (1) for releasably securing two members (2) and (4), such as wear plates to mining or earthmoving equipment. A first of the members (4) is provided with an anchor (5) which has a lip (7). A second of the members (3) is provided with a cutout (10), having a tongue (8), shaped to be positioned underneath the lip (7). Once the two members are aligned, one or more keeper (9) is placed and secured within the remainder of the cutout (10). The keeper may be of solid or hardenable material (FIGS. 1, 6), or may be formed by interlocking portions (FIG. 10).

9 Claims, 8 Drawing Sheets

LOCKING ARRANGEMENT

BACKGROUND OF THE INVENTION

The present invention relates to a locking arrangement for releasably securing two members. The locking arrangement of the present invention is particularly useful for adapting wear plates to equipment, such as utilised in the mining industry, in washeries, or, for crushing, etc.

1. Description of the Prior Art

The present invention provides advantages over the locking arrangement described in the Applicant's Australian Patent Application No. 52082/90, the specification of which should be considered to be incorporated entirely within the current disclosures.

The Applicant's Australian Application No. 52082/90, in summary, relates to a locking arrangement for locking a plurality of plate members to a base surface, the base surface being provided with a plurality of locking anchors provided in spaced apart relationship thereon, each of said plate members being provided with at least one anchor receiving member thereon, each of said anchor receiving members being adapted to engage one of said anchors, such that, the edges of each said plate members are adapted to abut with the edges of adjacent plate members, with the outer plate members being adapted to abut retaining members being affixed to said base surface, such that, each of said plate members is thereafter prevented from disengagement from said anchors.

It has been discovered that a composite arrangement can be provided, eliminating the necessity to utilise "retaining members" to hold the plate members together and to the equipment. This is achieved by using a "keeper" which is described more fully hereinafter.

2. Summary of the Invention

In one broad form, the present invention provides a locking arrangement for releasably securing two members, a first of said members having anchor means projecting from a surface thereof, with a lip portion extending transversely from the extremity of at least a portion of said anchor means;

a second of said members having a cutout in a surface thereof, to receive said anchor means, at least a portion of said cutout having a tongue around the opening thereof, shaped to be positioned underneath said lip portion of said anchor means, wherein, in use, said surfaces of said members are aligned by positioning said anchor means within said cutout and sliding one member relative to the other to engage said tongue under said lip portion, at least one keeper then being placed in at least part of said cutout not housing said anchor means, and secured to said first member, such that any movement between said members is impeded.

Preferably, the locking arrangement is embodied whereby the engagement of said lip portion and said tongue substantially prevent movement in any direction throughout a 180° range, the direction of engaging said tongue under said lip being substantially intermediate said range.

Preferably, said keeper is secured by screws, bolts, adhesive and/or welding or the like.

Preferably, each said keeper comprises releasable interlocking keeper portions.

Also preferably, each said keeper comprises two keeper portions, wherein, when interlocked, two opposed sides thereof taper outwardly towards their lowermost surface, and wherein at least one of said keeper portions is provided with a tool engaging portion to effect removal thereof relative to the other of said keeper portions.

In a preferred form, said tool engaging portion is adapted to receive a crow bar or like tool.

Preferably, said keeper portions are provided with a locking means to releasably retain said keeper portions together.

In a most preferred form, said locking means comprises:

providing a recess on one side of said keeper portions; and providing a protruding member on the other of said keeper portions, said protruding member being normally biased within said recess.

Most preferably, said protruding member is embodied as a steel rod, and said recess is embodied as a curved recess to receive a longitudinal portion of said steel rod, and wherein said steel rod is biased by a resilient means.

Alternatively, but also said keepers are shaped, formed by joining solid members and a hardenable resin-type material.

Also preferably, said solid members are shaped, such a jig-saw shaped to facilitate joining with said hardenable resin.

Also, preferably, one of said members is attached or configured as the underside of an earthmoving, mining, washery or crushing equipment, and the other member has wear plates attached thereto.

In a most preferred form of the invention, said anchors are of substantially moon-shaped or semi-circular configuration, wherein said lip portion covers substantially the entire outer edge thereof.

A preferred form of the invention is wherein both of said members are cut from a single sheet of material.

BRIEF DESCRIPTION OF THE DRAWINGS

The present invention will become more fully understood from the following description of preferred but non-limited embodiments thereof, described in connection with the accompanying drawings, wherein.

DETAILED DESCRIPTION OF PREFERRED EMBODIMENTS

Figure 1:
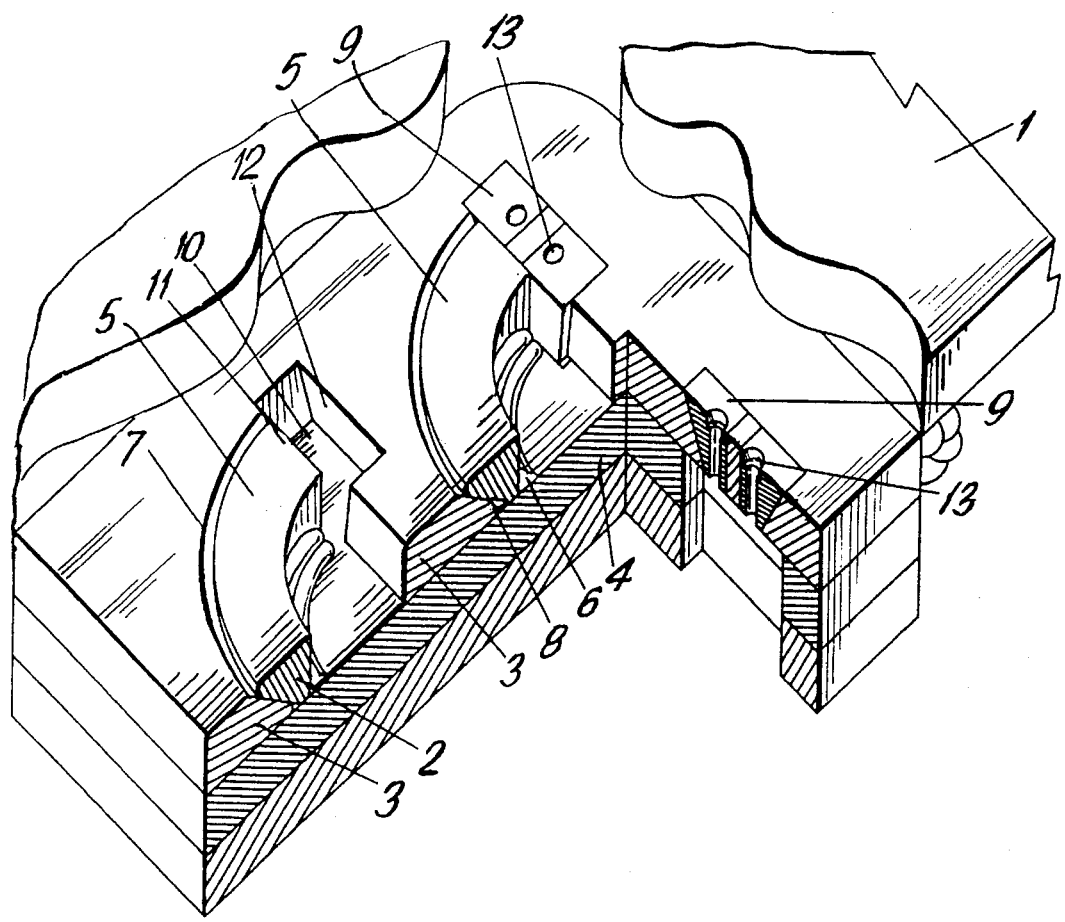
FIG. 1 shows an isometric view of a locking arrangement in accordance with a first embodiment of the present invention.
Figure 2:
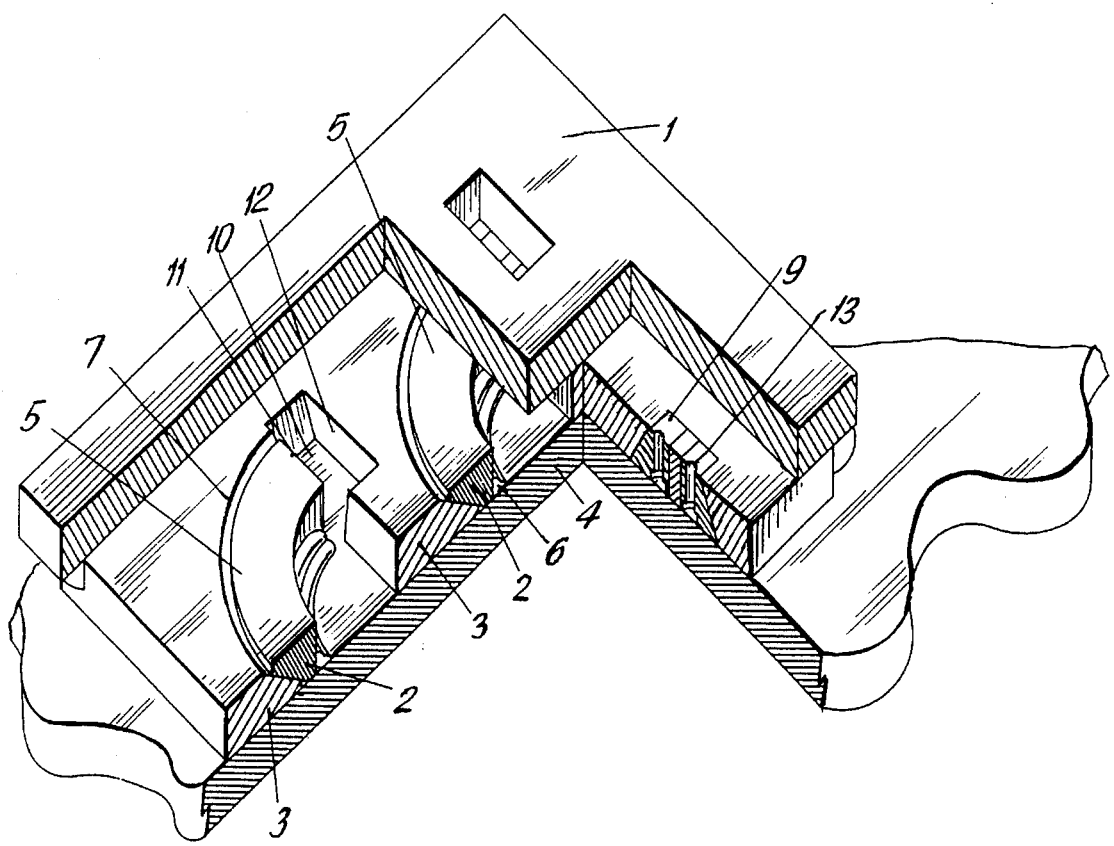
FIG. 2 shows an alternatively preferred arrangement of the locking device of the present invention.
Figure 3A:
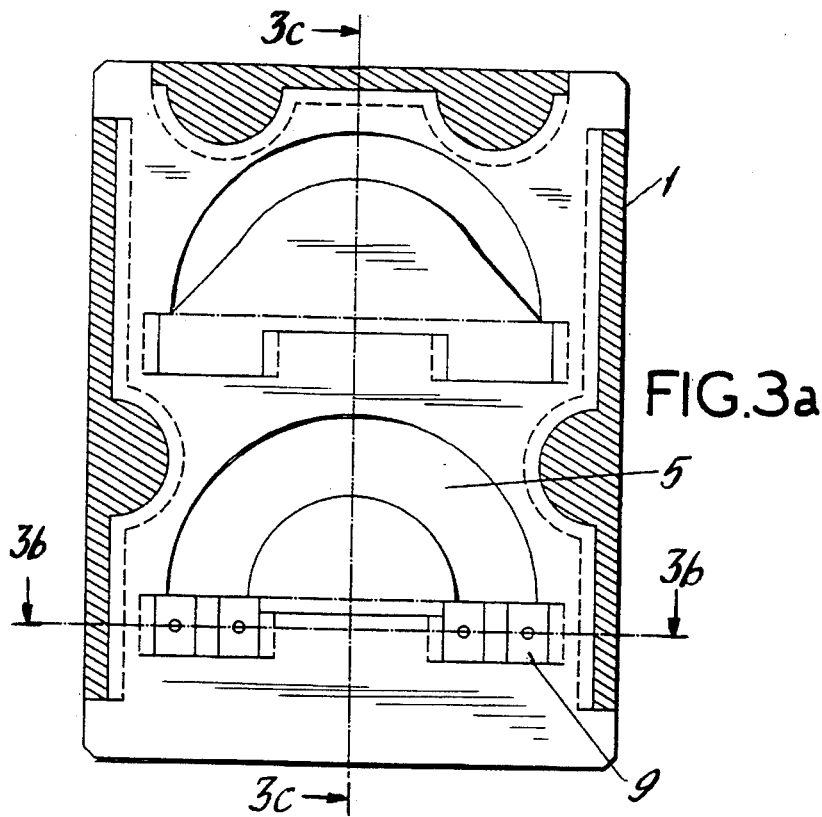
FIG. 3 shows plan and elevational views of the locking device described in FIG. 1.
Figure 3C:
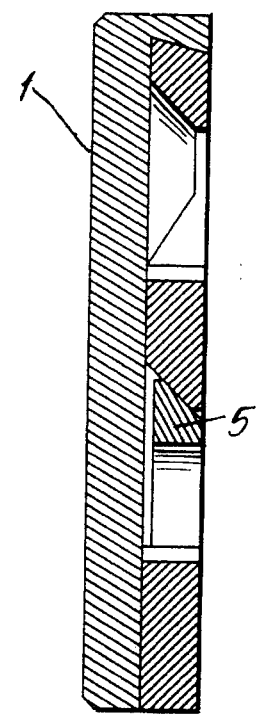
Figure 3B:
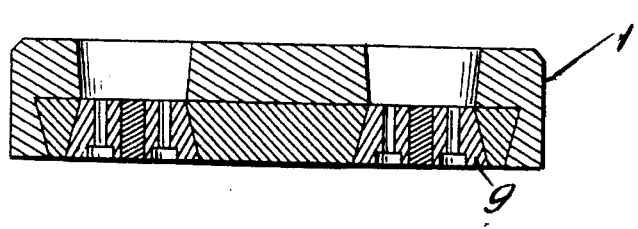
Figure 4A:
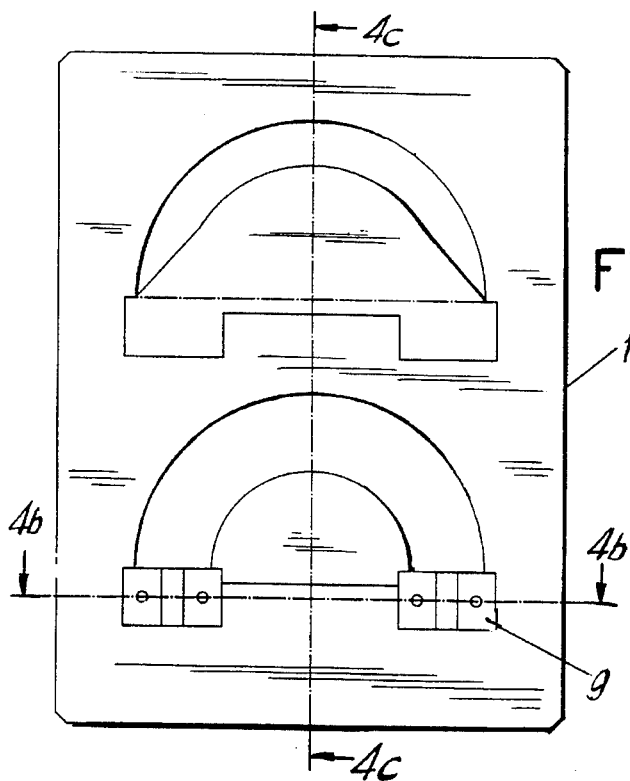
FIG. 4 shows plan and elevational views of the locking device described in FIG. 2.
Figure 4C:
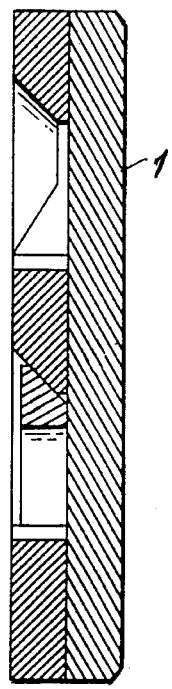
Figure 4B:
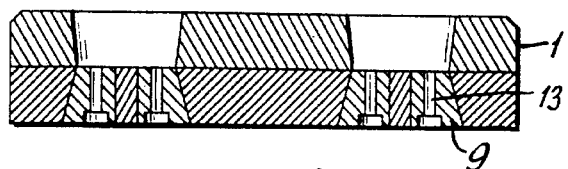
Figure 5A:
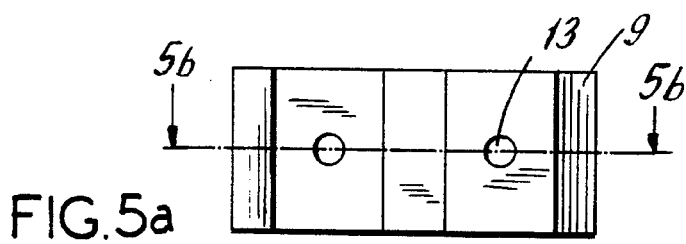
FIG. 5 shows top and sectional views of the "keeper"
Figure 5B:
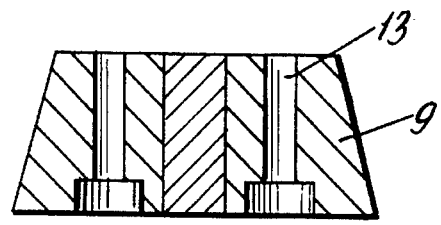

As described in the drawings, wherein like numerals are used to identify similar features, there is shown a locking arrangement, generally designated by the numeral 1, which comprises two members 2 and 3, to be releasably secured together.

The first of the members 2 is configured as a plate member 4 having an anchor 5 projecting therefrom, attached to the plate member 4 by weld 6. The extremity 7 of the anchor 5 is configured as a lip, that is, the anchor 5 is designed such that it's outer upper extremity 7 extends upwardly and outwardly from the connection between the anchor 5 and the plate member 4. The anchor 5 is shown in the drawings, to be of a semi-circular shape with the lip 7 extending around the outer surface thereof, however, it will be appreciated that other shaped anchors will function similarly and are consequently within the scope of the present invention.

The second member 3 is provided with a tongue 8 designed to be correspondingly and complimentarily shaped such that the tongue 8 is able to be positioned underneath the lip 7 of the anchor 5. That is, if the anchor 5 is provided with a substantially circular shaped lip 7 then the tongue 8 would also be of substantially circular shape. Likewise, if the anchor 5 were square or triangular in shape, so would be the tongue 8.

The drawings illustrate the locking arrangement in the secured position, wherein the connecting surfaces between the members 2 and 3 are substantially aligned, with the tongue 8 and member 3 sitting underneath the lip 7 of the anchor 5 of member 2. Once in this position, one or more keepers 9 may then be placed in cutout 10, abutting the edge 11 of anchor 5 and the surface 12 of plate 3, such that any movement between the members 2 and 3 is substantially prevented. The keeper 9 is preferably secured by means of screws, adhesive, bolts or welds to the member 2, for example by screws via screw shafts 13.

It will therefore be appreciated that once the keeper 9 is connected into position, no movement between the members 2 and 3 will be allowed. Consequently, a composite locking arrangement is achieved, eliminating the 'retaining means', etc., as described in the Applicant's afore-referenced Patent specification.

It will be understood that, in use, a variety of applications are envisaged. Pertinent arrangements might, for example, include use of the locking arrangement in attaching wear resistant plates to earth moving, mining, washery or crushing equipment.

It will be appreciated that either of the first or second members may be attached to the equipment and the other of said members is attached to the wear plates.

It will also be appreciated that a wide variety of shapes are envisaged. However, most preferably, the anchor is embodied such that movement in any direction throughout 180° range, the direction of engaging the tongue under the lip being substantially intermediate such a range, is most preferable. In this manner, the keeper only has to then prevent movement in the other direction, consequently preventing any movement between the plates 2 and 3 throughout the entire 360° range. The most practical shaped anchors are therefore of semi-circular shape as shown in the drawings, of triangular shape wherein the lips are provided about two sides of the triangle, or a square shape whereby the lips are provided about three sides of the square. Numerous other shapes, achieving this function, will however be envisaged.

It will also be appreciated that the members of the invention may either be separately molded, or, perhaps more preferably, the two members can both be cut from a single sheet of material. The advantage of this latter method is that wastage is reduced, and a neat bit is ensured. It is envisaged that a computer aided cutting tool could cut the members from a single sheet of material.

Figure 6:
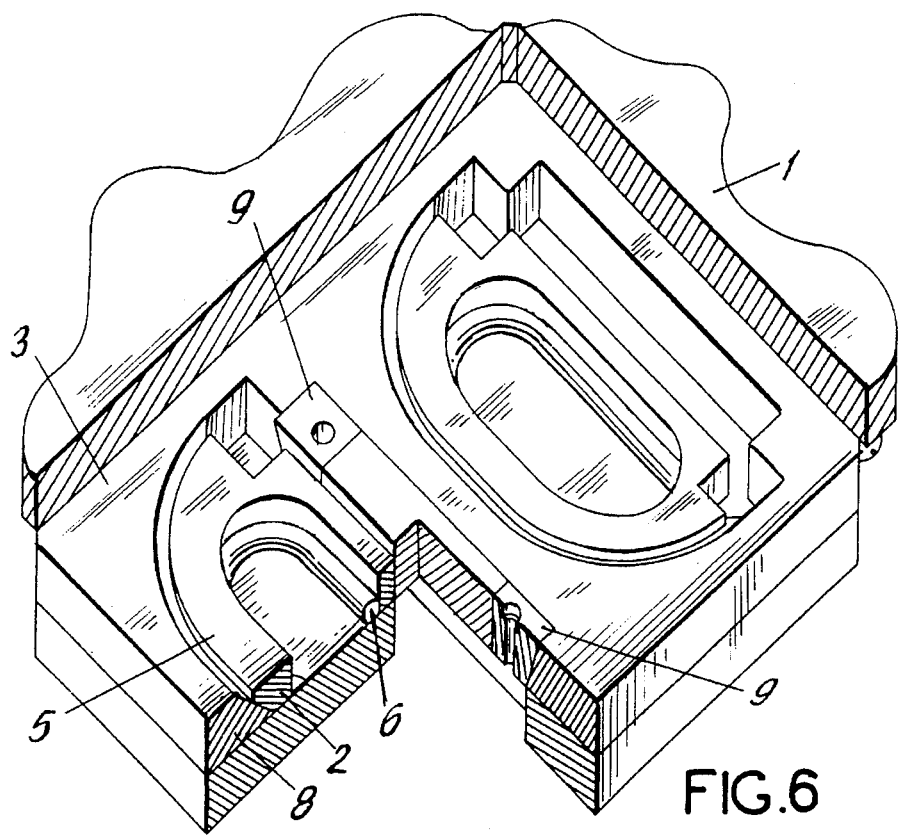
FIG. 6 illustrates, in isometric view, an alternative preferred arrangement of the locking device in accordance with the present invention.
Figure 7A:
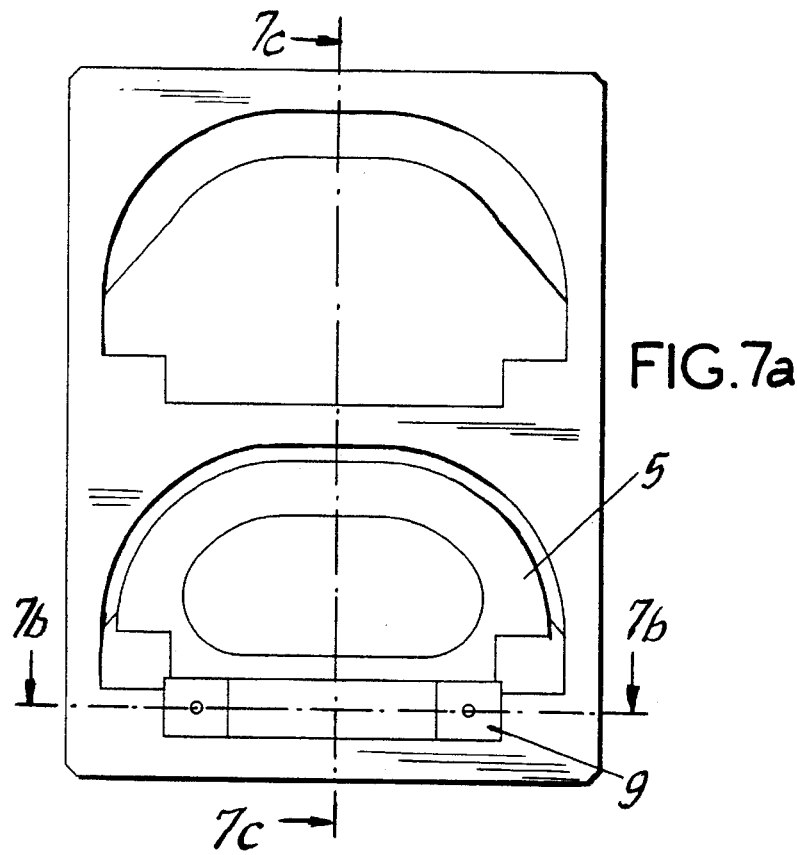
FIG. 7 shows plan and elevational view of the embodiment illustrated in FIG. 6.
Figure 7C:
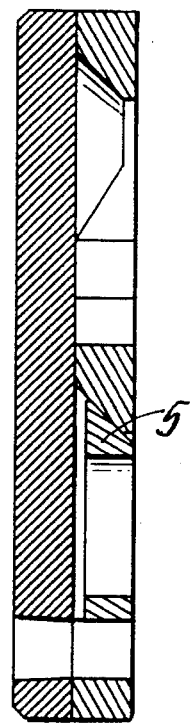
Figure 7B:
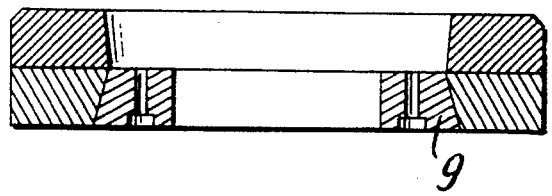

In FIGS. 6 and 7 are shown an alternatively preferred embodiment of the invention. The major deviation of this embodiment from that of the earlier described embodiments are that the keepers are provided in a slightly different position. It will be easily envisaged that a single keeper can be located "behind" the anchor, to retain the anchor in position. It will also be envisaged that only one anchor need be provided on each plate, that is, only every alternative (every 2nd, 3rd, etc) anchor receiving portion need receive an anchor to ensure that the two members are retained together.

Figure 8:
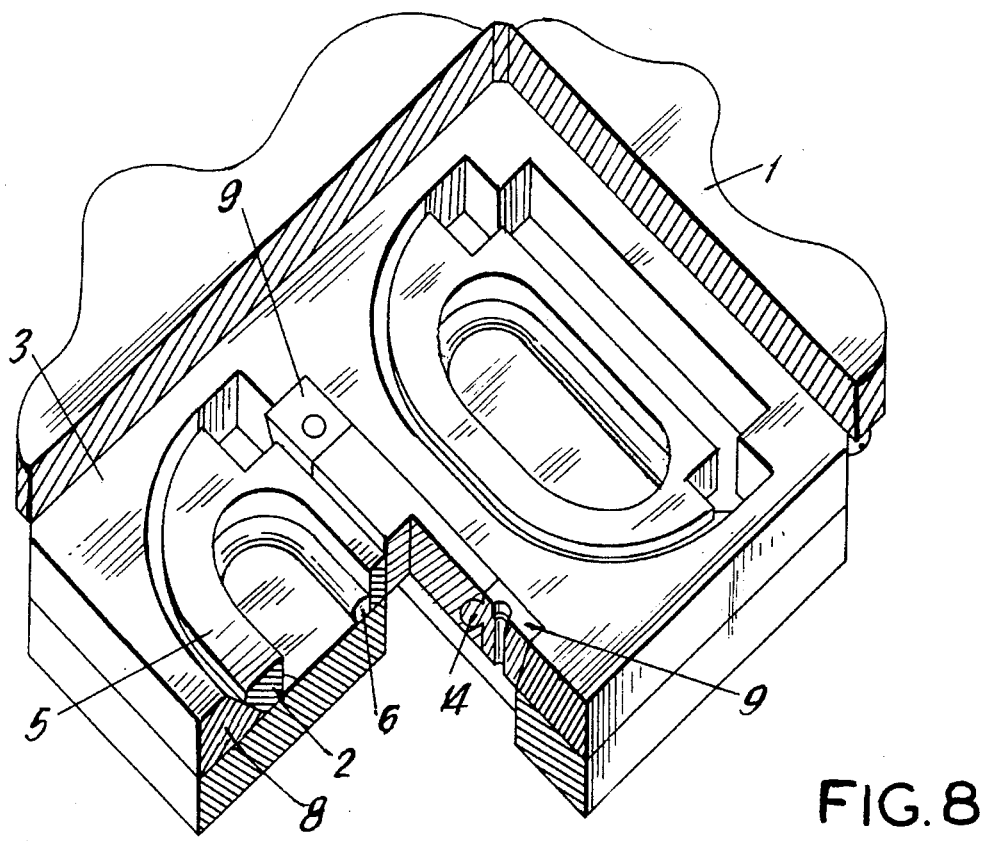
FIG. 8 shows, in isometric view, yet a further preferred embodiment of the locking device of the present invention.
Figure 9A:
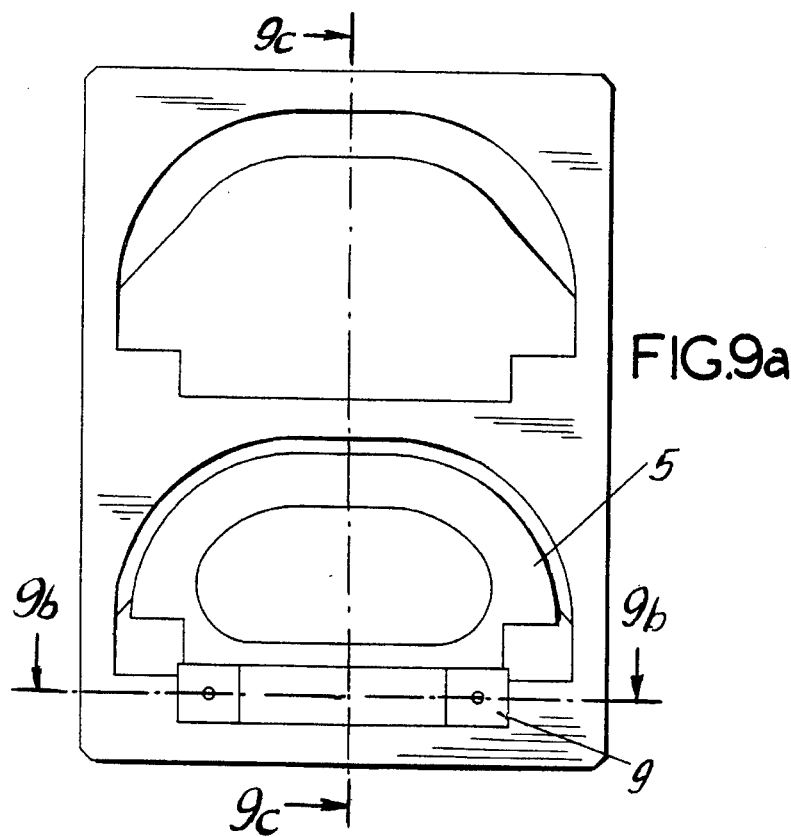
FIG. 9 illustrates plan and elevational views of the embodiment of FIG. 8.
Figure 9C:
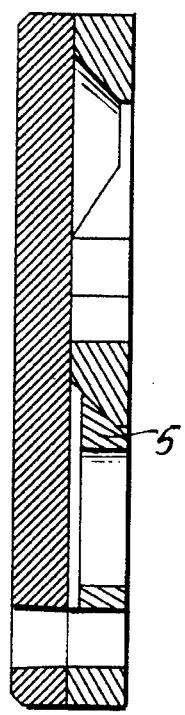
Figure 9B:
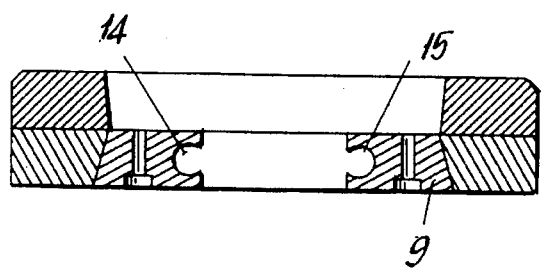
Figure 10A:
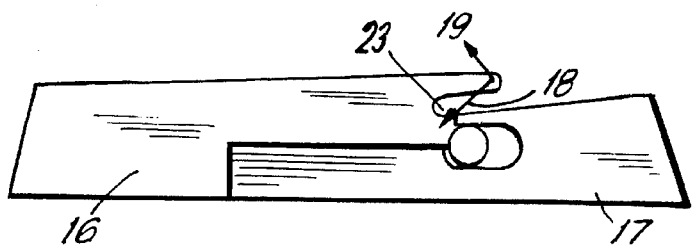
FIG. 10 shows various views of a further preferred form of the keeper, comprising two interlocking sections.
Figure 10B:
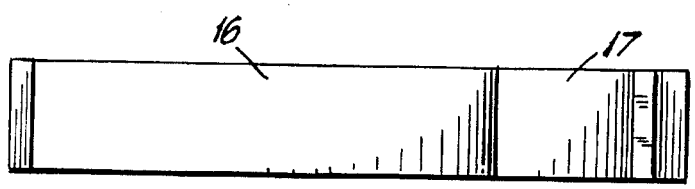
Figure 10C:
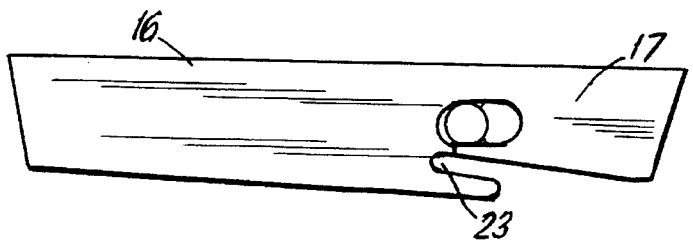
Figure 10D:
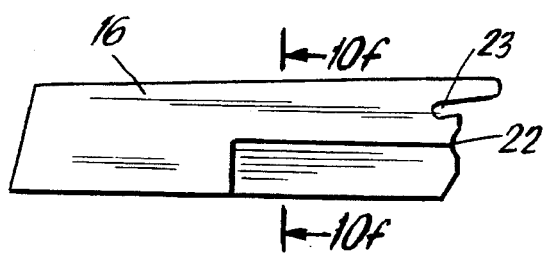
Figure 10E:
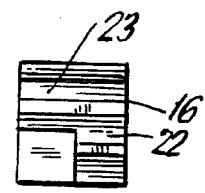
Figure 10F:
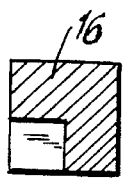
Figure 10G:
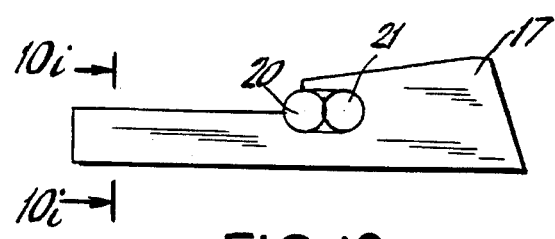
Figure 10H:
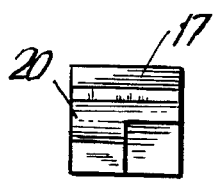
Figure 10I:
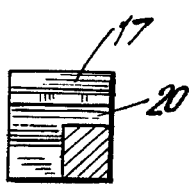

In FIGS. 8 to 9, are shown yet a further variation to the embodiment depicted in FIGS. 7 and 8. In this embodiment, a pair of keepers 9 are provided in spaced apart relationship behind each anchor 9. Each of the keepers 9 is provided with a 'jigsaw' shaped protrusion 14 or indent 15 thereon designed to facilitate a good and sturdy connection to a resin material a cementatious material provided therebetween. The 'jigsaw' shaped protrusion may be embodied in any desirable shape.

In FIG. 10, is shown various views of a keeper, comprising two interlocking portions 16 and 17. FIGS. 10(*a*), 10(*b*) and 10(*c*) showing front, top and rear views of the keeper in the interlocked position. FIGS. 10(*d*), 10(*e*) and 10(*f*) illustrate front, end and a sectional view (through AA) of a first of the portions 16, and FIGS. 10(*g*), 10(*h*) and (*i*) illustrate front, end and sectional views (through BB) of a second of the portions 17.

To install the keeper, second portion 17 is positioned in the portion of cutout 10 not housing the anchor 5 and then the first portion 16 is pushed into position in the direction shown by arrow 18. In the engaged position, the steel bar 20 within part 17, under bias of the rubber compound 21 is forced into the recess 22 in part 16, such that the two parts 16 and 17 become effectively interlocked. To disengage the members 16 and 17, a tool, such as a crow foot bar may be supplied in orifice 23 to force movement of member 16 in the direction of arrow 19 against the bias of the bias means 21 holding the bar 20 into recess 22.

It will be appreciated that numerous other types of interlocking members may become apparent, from the disclosures herein, to a person skilled in the art. All such variations and modifications should be considered to be within the scope of this invention. For example, there would be other ways of interlocking the two portions 16 and 17, other ways of disengaging the two portions 16 and 17, etc.

It will however be appreciated that the embodiment of the keeper described in FIG. 10 has certain advantages over the earlier described keepers, including the easy engagement and disengagement thereof, and the simple mechanism by which the two portions become effectively interlocked. Numerous other shaped keepers will become apparent also, however, it should be noted that the shown embodiment, being tapered at its side portions, ensures that the keeper cannot easily become dislodged from the cutout 10 of member 3.

All other variations and modifications which become apparent to persons skilled in the art should also be considered to be included in the scope of the invention as broadly described hereinbefore.

I claim:

1. A locking arrangement for releasably securing a first member to a second member, a surface of said first member having anchor means projecting therefrom with a lip portion of said anchor means transversely extending from an extremity of at least a portion of said anchor means, a surface of said second member having a cutout portion defining an opening adapted to lockingly engage said anchor means, at least a portion of said cutout having a tongue around the opening thereof shaped to be positioned underneath said lip portion of said anchor means, such that during use, a surface of each of said first and second members is aligned by positioning said anchor means within said cutout opening by sliding one member relative to the other and thereby cause engagement of said tongue underneath said lip portion, two keepers inserted in at least a part of said cutout not occupied by said anchor means to releasably secure said first member to said second member, wherein movement between said members is inhibited, each of said keepers having releasable interlocking portions adapted to retain said keepers together.

2. The locking arrangement as in claim 1, wherein the locking of said first member to said second member is achieved by engagement of said lip portion with said tongue portion thereby inhibiting movement in any direction throughout a 180° range, the engagement of said tongue to and under said lip portion being intermediate of said range of 180°.

3. The locking arrangement as claimed in claims 1 or 2, wherein said keepers are secured by fastening means selected from the group consisting of screws, bolts, adhesive and by welding.

4. The locking arrangement as in claims 1 or 2, wherein said two keepers, when interlocked, the opposed sides thereof taper outwardly and downwardly to their lower portions, at least one of said keeper portions being provided with a tool engaging means to effect removal of one relative to the other.

5. The locking arrangement as in claim 4, wherein said tool engaging means is adapted to receive a crow bar or similar tool engaging means to effect removal of one keeper with respect to the other.

6. The locking arrangement as set forth in claim 5, wherein the locking means comprises a recess in one side of one of said keepers and a protruding member on the other of said keepers, said protruding member being shaped to enter and lockingly engage said recess.

7. The locking arrangement as in claim 6, wherein the protruding member is a circular steel rod and said receiving recess is circular and made of yieldable resilient material to enable the rod to enter the recess and to be held thereby.

8. The combination of a locking engagement as in claims 1 or 2 including connectable means, wherein said first or second member is attached by said connectable means to an underside of an equipment selected from the group consisting of earth moving, mining, washery and crushing equipment and wherein said second or first member contains wear plates lockingly engaged thereto.

9. A locking arrangement as in claims 1 or 2 wherein said anchor means are substantially semi-circular in configuration with said lip portion extending along substantially the entire outer edge thereof.

\* \* \* \* \*